United States Patent [19]

Forster et al.

[11] 3,771,613
[45] Nov. 13, 1973

[54] WEIGHT STANDARDIZATION MACHINE
[75] Inventors: Peter E. Forster, Brecksville; Ronald R. Nowak, Kirtland, both of Ohio
[73] Assignee: The Motch & Merryweather Machinery Co., Cleveland, Ohio
[22] Filed: June 8, 1972
[21] Appl. No.: 260,814

[52] U.S. Cl.................. 177/60, 177/67, 177/82, 83/77
[51] Int. Cl............................................. G01g 13/00
[58] Field of Search................ 177/60, 62–64, 177/66, 67, 82, 89, 105; 83/77

[56] References Cited
UNITED STATES PATENTS

| | | | |
|---|---|---|---|
| 970,826 | 9/1910 | Hoyt | 177/60 X |
| 1,041,278 | 10/1912 | Hayssen et al. | 177/60 X |
| 2,753,144 | 7/1956 | Seem | 177/60 X |
| 2,812,792 | 11/1957 | Allbright | 177/60 X |
| 2,903,032 | 9/1959 | Cervene | 177/60 X |
| 3,175,438 | 3/1965 | Johnson | 83/77 X |
| 3,274,377 | 9/1966 | Morison | 177/60 X |
| 3,476,198 | 11/1969 | Francis | 177/60 X |

Primary Examiner—Richard B. Wilkinson
Assistant Examiner—Stanley J. Witkowski
Attorney—Walter Maky

[57] ABSTRACT

A weight standardization machine for workpieces such as connecting rods for internal combustion engines and the like, said machine having a load station from which workpieces are successively advanced to a weight station whereat a weighing scale determines the magnitude of overweight of successive workpieces thereon, and to a work station whereat successive workpieces are clamped for removal of excess weight as by a milling machine, the overweight information determined by the weighing scale being converted and stored to control the feed stroke of the milling cutter to remove precisely the right amount of metal when the previously weighed workpieces are successively clamped at the work station, and there being provided a sensing means responsive to engagement of the milling cutter with the workpiece to initiate said predetermined feed stroke as determined by the weighing scale converter.

7 Claims, 9 Drawing Figures

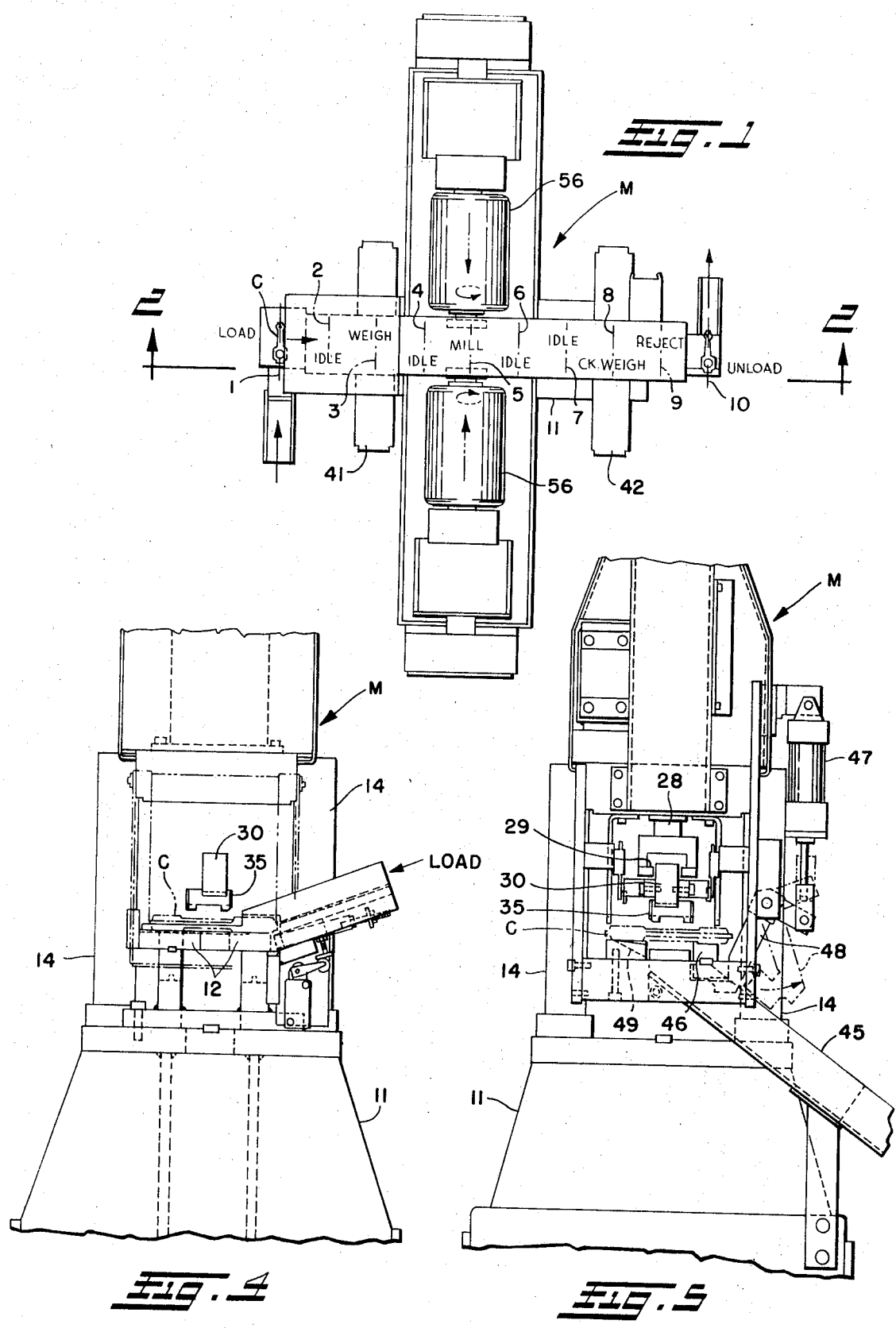

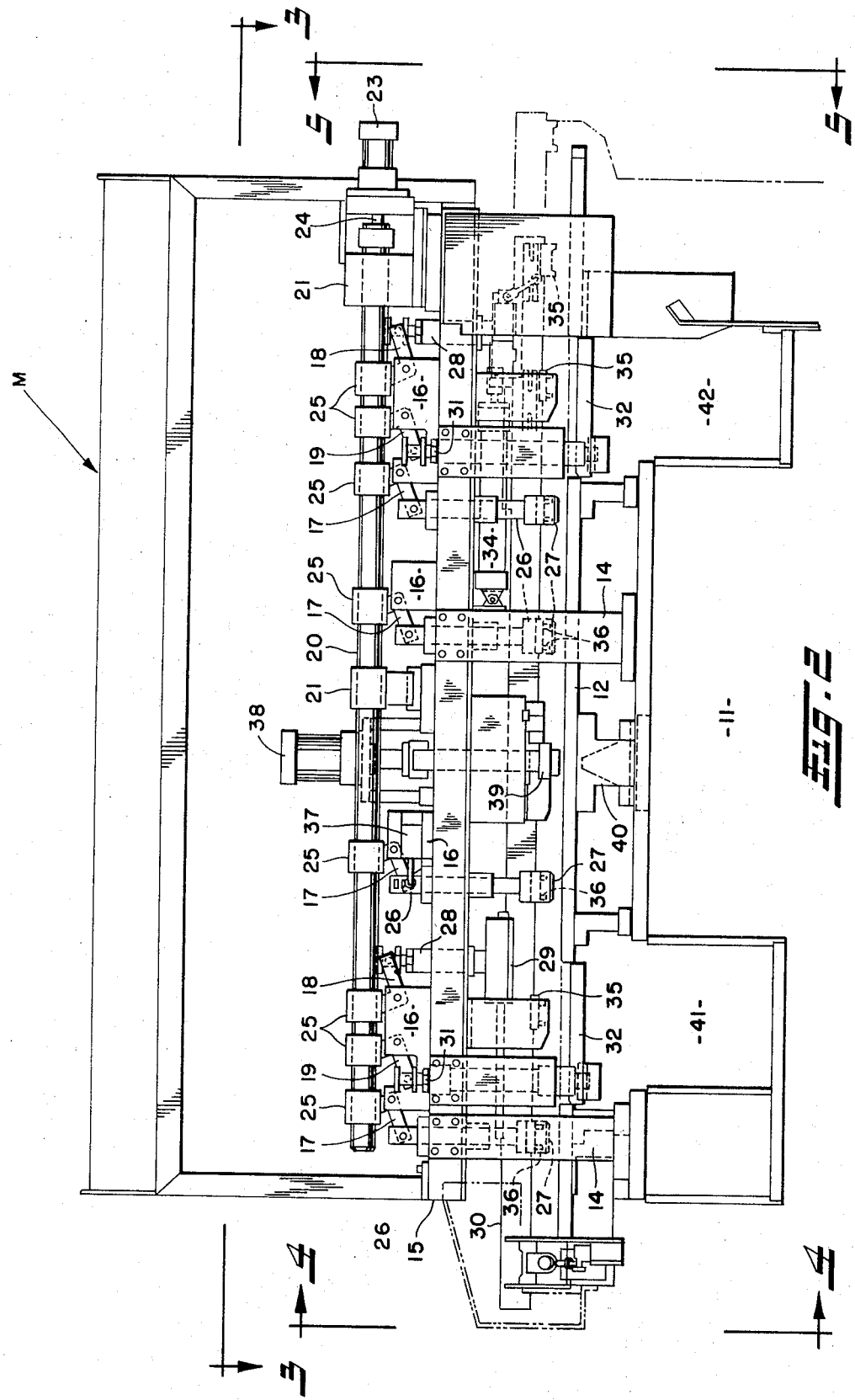

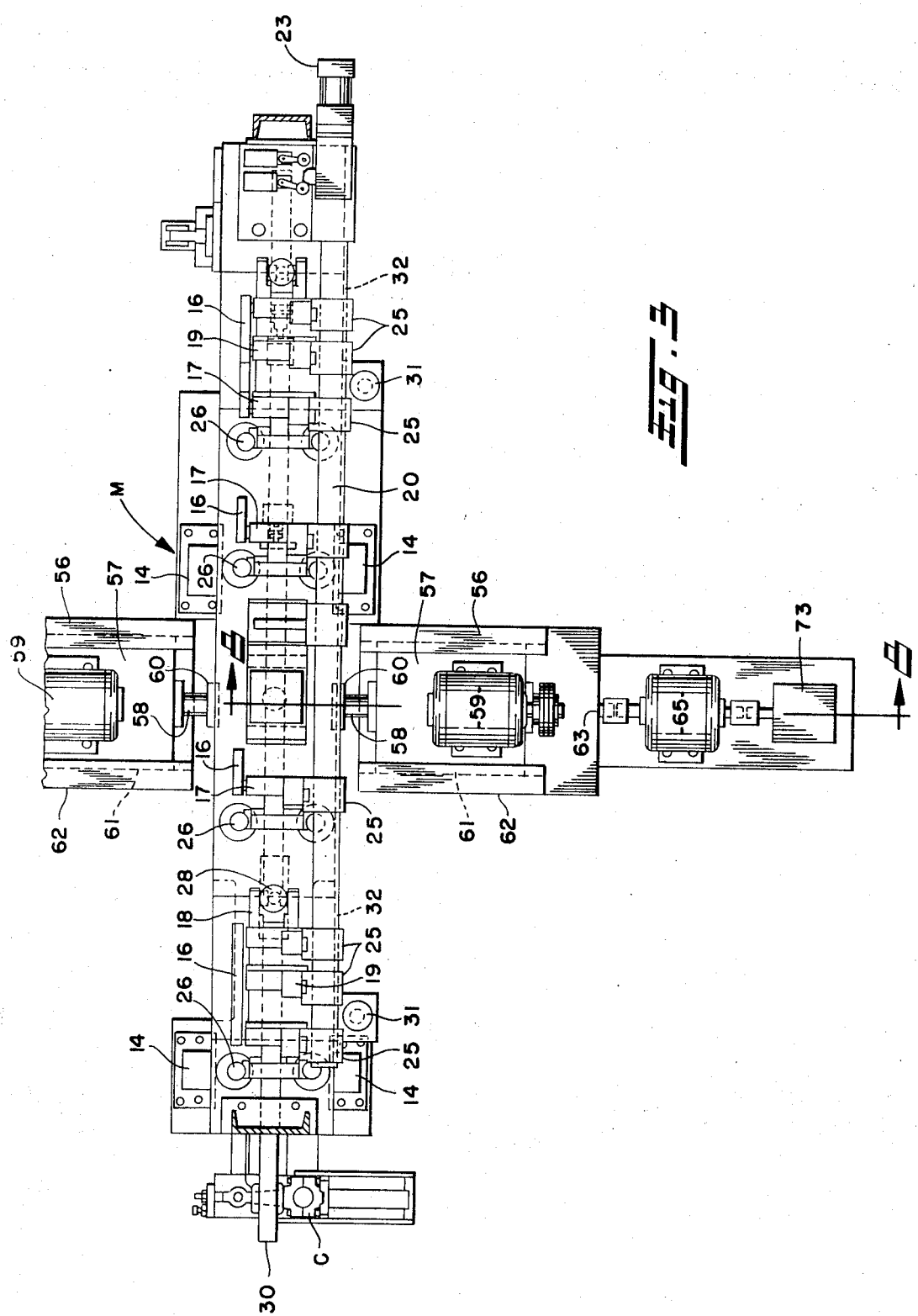

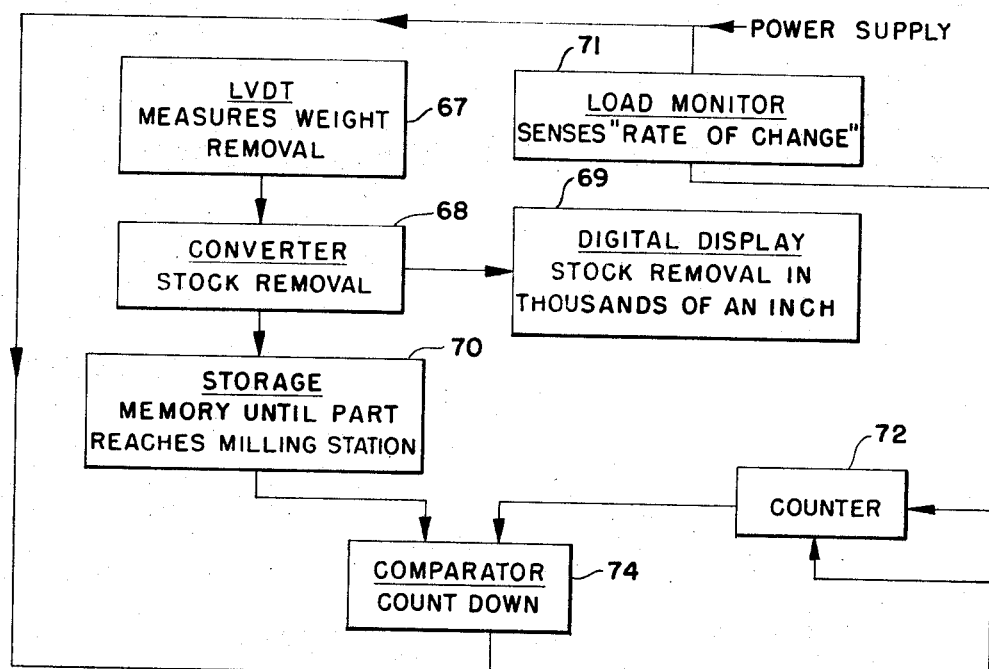
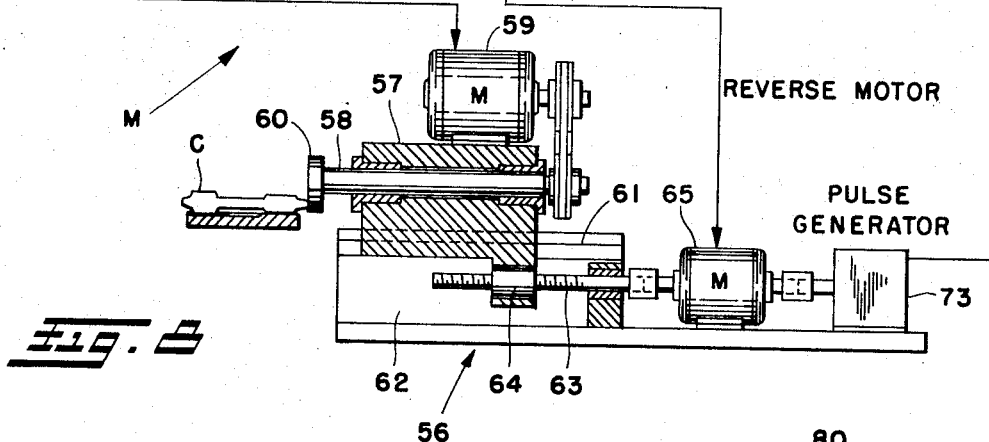
Fig. 8
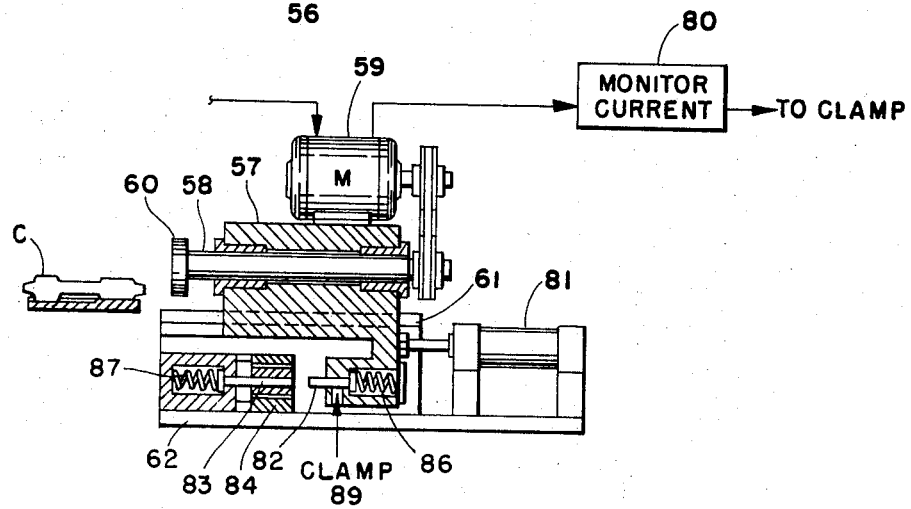
Fig. 9

WEIGHT STANDARDIZATION MACHINE

BACKGROUND OF THE INVENTION

In the weight standardization of workpieces such as connecting rods one known practice is to pre-mill the weight bosses at the crank pin and wrist pin ends of the connecting rod to provide a reference plane at each end which is a specified accurate distance from the axis of the respective crank pin and wrist pin bores. After such pre-milling operation, the connecting rod is weighed and the scale determines how much metal is to be removed from the respective weight bosses thus to set the advance of the cutting tools from such pre-milled reference planes.

Another known method of standardizing the weight of workpieces such as connecting rods is to weigh the connecting rod to determine the magnitude of overweight of the crank pin and wrist pin ends thereof and then by means of a probe on the machine tool determine the locations of the end faces of the weight bosses whereupon the cutting tools are advanced predetermined distances from such probed locations.

SUMMARY OF THE INVENTION

With the foregoing in mind, it is a primary object of this invention to provide a weight standardization machine applicable to connecting rods, for example, which eliminates the aforesaid pre-milling operation and which eliminates the necessity of providing a probe on the machine to determine the location of the end faces of the weight bosses of the connecting rods.

It is another object of this invention to provide a weight standardization machine which is of substantially reduced cost by virtue of the elimination of the pre-milling station and which increases the productivity of the machine as compared with known machines by eliminating the probing operation and further by providing idle stations between the load, weigh, and work stations so that the workpieces may be quickly indexed from the respective idle stations to the weigh and work stations.

Other objects and advantages of the present invention will become apparent as the following description proceeds.

BRIEF DESCRIPTION OF THE DRAWING

FIG. 1 is a top plan view in diagrammatic form of a preferred form of a machine for standardizing the weight of workpieces such as connecting rods;

FIG. 2 is a front elevation view on somewhat enlarged scale as viewed along the line 2—2, FIG. 1;

FIGS. 3, 4 and 5 are top plan, and end elevation views as viewed along the respective lines 3—3, 4—4 and 5—5 of FIG. 2;

FIG. 8 is a cross section view of the milling machine taken substantially along the line 8—8, FIG. 3, and illustrating in addition the control for achieving automatic removal of a prescribed amount of metal from the weight bosses as determined by the weighing scale; and FIG. 9 is a cross section view similar to FIG. 8 except illustrating a modified form of milling machine.

DETAILED DESCRIPTION OF THE DRAWING

Referring first to FIG. 1, the weight standardization machine M herein is employed for standardizing the weight of workpieces such as internal combustion engine connecting rods C as by milling excess weight from weight bosses at the crank pin and wrist pin ends thereof. By way of illustration, the weight standardization machine M in FIG. 1 comprises 10 stations as follows:

| | |
|---|---|
| Load station | 1 |
| Idle Station | 2 |
| Weighing Station | 3 |
| Idle Station | 4 |
| Milling Station | 5 |
| Idle Station | 6 |
| Idle Station | 7 |
| Check Weighing Station | 8 |
| Reject Station | 9 |
| Unload Station | 10 |

Figure 6:
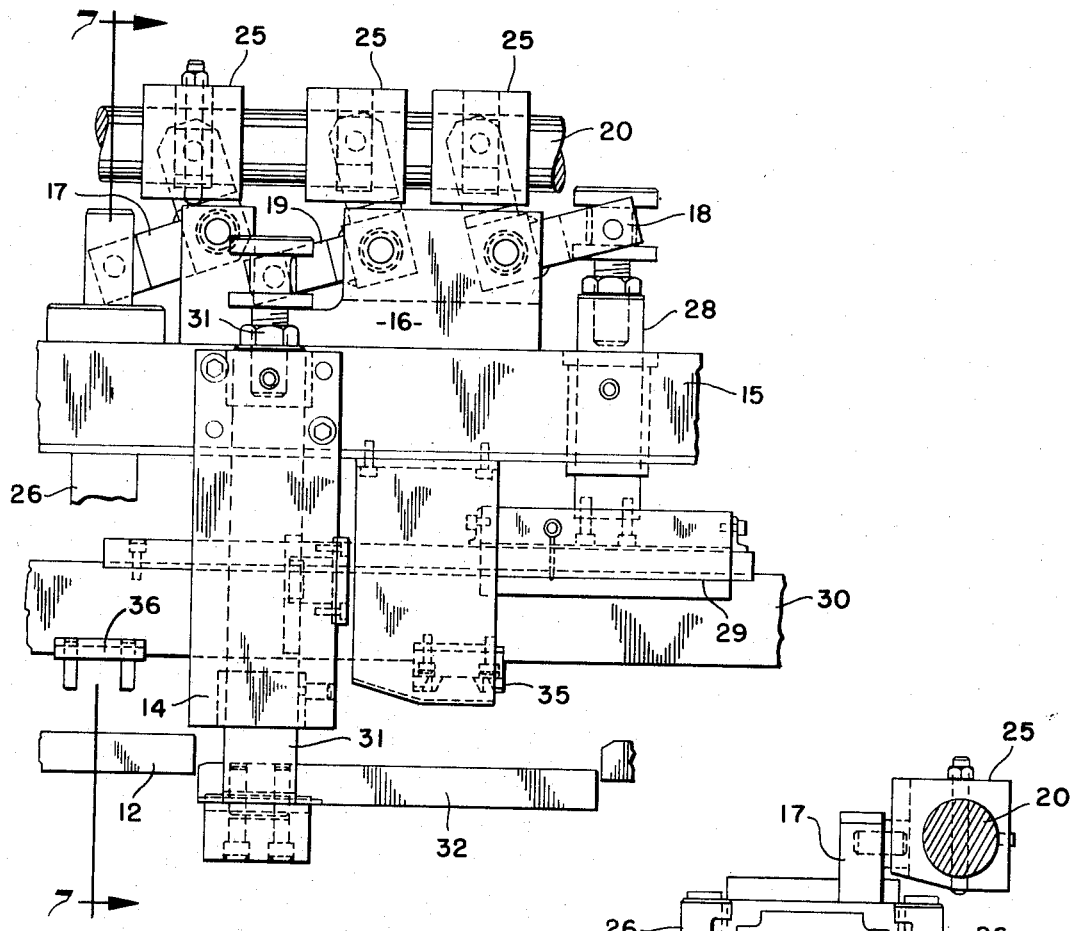
FIG. 6 is a fragmentary front elevation view at the weigh station on still further enlarged scale.
Figure 7:
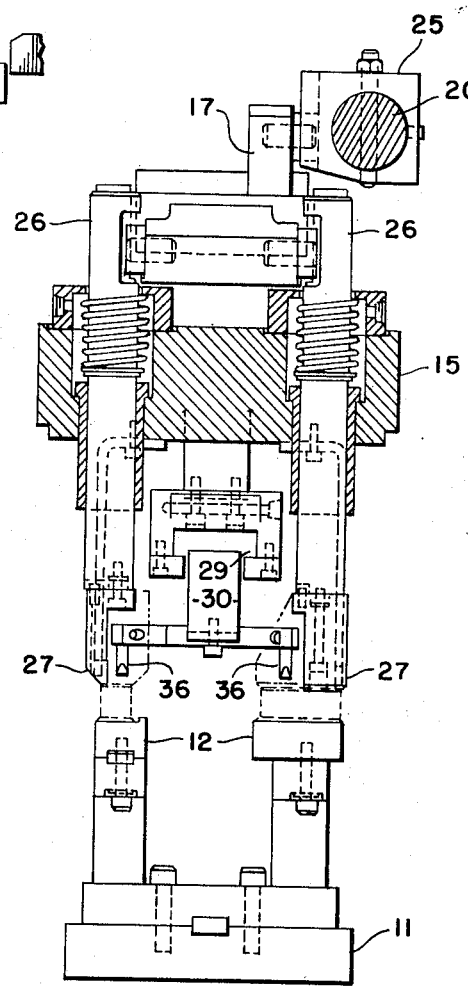
FIG. 7 is a cross section view taken substantially along the line 7—7, FIG. 6.

Referring now to FIGS. 1 through 8 the weight standardization machine M comprises a base 11 having parallel longitudinal rails 12 for supporting the connecting rods C in horizontal position with their crank pin and wrist pin ends resting upon the rails 12 and with the axes of the crank pin and wrist pin bores disposed in vertical position. As aforesaid, the first station is the loading station 1 and at that station connecting rods C may be sequentially manually loaded onto the rails 12 or, if desired, automated conveyor means may be provided to successively transfer connecting rods C to said loading station 1, from which they are successively indexed through the stations 2 through 10 by means now to be described.

The base 11 has upstanding columns 14 on which the upper frame members 15 are supported, said frame members 15 having secured thereon pairs of brackets 16 in which bell cranks 17, 18 and 19 are pivotally supported for actuation by the actuator bar 20 which is longitudinally reciprocably supported by the bearings 21, reciprocation of said bar being effected by the cylinder 23 which has its piston rod 24 connected to said bar 20. Said bar has thereon several collars 25 which have vertical slots to engage the upper ends of the bell cranks 17, 18 and 19 and the other ends of the bell cranks 17, 18 and 19 are engaged with vertically guided rods 26 having pilots 27 to enter the bores of the connecting rods C, with vertically guided rods 28 having T-slot connections 29 with the index bar 30, and with vertically guided rods 31 to raise and lower the sections 32 of the rails 12 at the weigh and check weigh stations 3 and 8. The index bar 30 is reciprocated longitudinally along the T-slot connections 29 as by means of the cylinder 34.

The index bar 30 has connecting rod engaging members 35 secured thereto which are adapted to engage the rod portions of the respective connecting rods C at the load, weigh, milling, check weigh, and reject stations 1, 3, 5, 8 and 9 to advance the connecting rods C to the respective succeeding stations when the lowered index bar 30 is moved to the right from the FIG. 2 position. The index bar 30 also has connecting rod engaging members 36 in the form of parallel pins with beveled ends to enter the connecting rod bores for precision indexing from the idle station 2 to the weigh station 3, from the idle station 4 to the milling or work station 5, from the idle station 6 to the idle station 7, and from the idle station 7 to the check weigh station 8 when the lowered index bar 30 is moved to the right from the FIG. 2 position.

When the bell crank actuating bar 20 is moved to the left position as shown in FIG. 2, the pilots 27 are moved downwardly by the bell cranks 17 to retain the connecting rods C in indexed position and the index bar 30 together with the connecting rod engaging members 35 and 36 are lifted out of engagement with the respective connecting rods C whereby the cylinder 34 may be actuated to shift the index bar 30 to the left position as shown in FIG. 2 to position the respective engaging members 35 and 36 above the connecting rods C at the respective stations. When the pilot 27 at the idle station 4 is lowered, it trips a switch 37 to energize the hydraulic clamp cylinder 38 at the milling station 5 to cause the piloted clamp members 39 to firmly clamp the connecting rod C against the rails 12 which are backed up by a block 40 on the base 11.

When the index bar 30 is in lowered position and when it is advanced, the rail sections 32 are even with the preceding and following portions of the rails 12 whereby the connecting rods at stations 1 to 9 are advanced to the succeeding stations 2 to 10. Now, when the index bar 30 is raised the rail sections 32 are lowered by the bell cranks 19 to lower the connecting rods C on rail sections 32 onto the weighing platforms of the weighing scales 41 and 42 which respectively determine the overweight of the crank pin and wrist pin ends of the connecting rod C at weigh station 3 and determine whether the milled connecting rod C at the check weigh station 8 is within prescribed weight standard limits.

The reject station 9 as best shown in FIGS. 2 and 5 comprises a reject chute 45 and a rear rail section 46 which is swung to the phantom line position of FIG. 5 by the cylinder 47 and bell crank 48, the front rail section being formed with a beveled top face 49 to permit tilting of the rejected connecting rod C for sliding down the chute 45 when the rail section 46 swings down and is disengaged from the wrist pin end of the connecting rod C. The cylinder 47 is actuated by the check weigh scale 42 when the milled connecting rod C is outside the prescribed weight standard limits. If the check weighed connecting rod C is of required standard weight, the rear rail section 46 will be in the FIG. 5 solid line position whereby the check weighed connecting rod C will be advanced successively to stations 9 and 10.

Referring now in detail to the weighing scale 41 at the weigh station 3 and to the milling machines 56 at the milling station 5, each of the latter as shown in FIGS. 3 and 8 comprises milling head slide 57 having a spindle 58 which is driven by motor 59 and which has a milling cutter 60 thereon adapted to be fed toward and away from the respective weight boss at the end of the connecting rod C clamped at milling station 5 when the slide 57 is actuated along the ways 61 of the base 62 by the ball feed screw 63, the ball feed screw 63 being engaged with ball nut 64 and being driven by the reversible motor 65.

The weighing scale 41 has duplicate control elements for the respective milling machines 56 and hence only one has been shown in FIG. 8 for removal of metal from the crank pin end of the connecting rod clamped at milling station 5. In this case the well known linear variable differential transformer 67 (LVDT), such as the model No. M1 manufactured by Comptrol, Inc., Cleveland, Ohio, measures the amount of overweight of the crank pin end of the connecting rod C when the latter is at the weigh station 3, the analog signal from said LVDT 67 being converted by the well known analog to digital converter 68 to a digital amount of overweight of the crank pin end in terms of grams and tenths of grams and also being modified by a factor related to the cross-sectional dimensions of the weight boss and converted to a digital figure in thousandths of an inch at a conventional digital display unit 69. The length of weight boss removal is then retained in memory in the conventional storage unit 70 until the connecting rod C reaches the milling station 5. The analog to digital converter 68, digital display unit 69, and storage unit 70 may be, for example, the model 148-65398 manufactured by Moog Controls Division of Moog, Inc., East Aurora, N.Y.

The milling cutter 60 adaptive control herein illustrated senses the location of the end of the weight boss from which point the cutter 60 is advanced in 0.001 inch increments until the length of stock corresponds to that stored in the storage unit 70. Specifically the load of the milling cutter drive motor 59 is monitored by the load monitor 71, such as model MEK-2137 manufactured by Machine Electrification, Inc., Northboro, Mass., to sense the rate of increase in the load which occurs between running at idle and when the cutter 60 contacts the weight boss. When the rate of increase is of specified adjustable value, operation of the conventional counter 72 is initiated in conjunction with a pulse generator 73 coupled to the feed motor 65 and with a standard comparator count down unit 74. Both the counter 72 and the pulse countdown unit 74 may be, for example, the above model 148-65398 manufactured by Moog Controls Division. The pulse generator 73 will be arranged to provide a pulse for each 0.001 inch advance of the cutter 60 after such predetermined rate of increase of load. When the number of pulses equals the figure from the storage unit 70, the feed motor 65 is reversed. Although specific equipment has been set forth above to perform the well known functions of the L.V.D.T. 67, analog to digital converter 68, digital display unit 69, storage unit 70, load monitor 71, counter 72, and comparator 74, other similar devices may be substituted for any one or more thereof to provide a working machine in accordance with the invention.

The rate of load increase in watts is preferably employed because it is not affected by variation due to a cold or warm machine. However, it is to be understood that contact of the cutter 60 with the weight boss may be sensed by increased current draw of the motor 59, by torsional deflection of the spindle 58, or by vibration pickup. The rate of increase of load should be adjusted so that a slight increase may occur without triggering the start of the measured weight boss removal, as when the cutter 60 engages forging flash or other irregularity on the weight boss. Tests have shown that a 0.5 gram of weight boss removal will cause sufficient increase in cutter 60 load to uniformly sense the location from which the measured amount of weight boss removal starts. The digital display 69 is so arranged that the performance of the machine can be observed while it is cycling. The load monitor 71 may also be employed to control the feed motor 65 to reduce its speed from rapid approach to milling feed when the cutter 60 contacts the weight boss thus to further reduce machine cycle time.

After both ends of a connecting rod C at station 5 have been milled, the connecting rod C will be advanced successively through the two idle stations 6 and 7 and then to the check weigh station 8 which may have a weighing scale 41 essentially of the same construction as that at the weigh station 3 except that the LVDT 67 signal is transmitted to the reject station 9 in the event that the milled connecting rod C does not meet the required weight specifications and when such reject signal is transmitted to the reject station 9, the reject cylinder 47 is actuated to allow the non-standard weight connecting rod C to fall down the reject chute 45. If the milled connecting rod C passes the requirements of the check weigh station 8, it is allowed to pass the reject station 9 and then be indexed to the unload station 10.

In an illustrative example of this invention, the stations 1 to 10 were spaced apart 10 inches and the machine cycle time was 0.034 minutes with a milling time of 0.041 minutes whereby the total floor to floor time of the connecting rods C was 0.075 minutes to provide a production (based on maximum weight removal) of 800 connecting rods per hour or 900 connecting rods per hour based on a mean length of weight boss removal. As apparent, the provision of the idle stations shortens the indexing stroke to 10 inches as aforesaid and of course, while the pilots 27 are in lowered position, and while the index bar 30 and rod engaging members 35 and 36 are in raised position, the index bar 30 may be shifted to the left to the FIG. 2 position during the time that the milling operations are in progress whereby as soon as the milling operations have been completed and as the milling cutters are being retracted, the bell crank actuating bar 20 may be shifted to the right from the FIG. 2 position to raise the pilots 27 and to lower the index bar 30 and rod engaging members 35 and 36 followed by indexing movement of the index bar 30 toward the right to advance the connecting rods C from station 1 to 2, 2 to 3, etc. Of course, at the milling station 5, the clamping cylinder 38 is actuated to release the piloted clamps 39 from the milled connecting rod C so that the milled connecting rod C may be indexed from station 5 to the idle station 6.

In FIG. 9, the load monitor 80 is responsive to increased current draw of the spindle 58 drive motor 59 to sense when the cutter 60 engages the weight boss of the connecting rod C and the slide 57 is actuated by the hydraulic motor 81. As the cutter 60 advances toward the weight boss, the plunger 82 yields with respect to the plunger 83 of the LVDT 84 on the base 85 by reason of the spring 86 being weaker than spring 87. However, when the cutter 60 engages the weight boss, the current draw of motor 59 increases to magnitude sufficient to actuate the clamp 89 and thereafter the plungers 82 and 83 move in unison and when the output signal from LVDT 84 matches that of the LVDT 67 of the weighing scale 41, the hydraulic motor 81 is reversed to move the cutter 60 away from the milled weight boss.

The embodiments of the invention in which an exclusive property or privilege is claimed are defined as follows:

1. A weight standardization machine for machining workpieces of variable overweight to a predetermined weight standard comprising a weighing station whereat a weighing scale determines the magnitude of overweight of a workpiece thereon; a work station whereat a metal working machine having clamp means for clamping a weighed workpiece thereat and cutter means movable toward the clamped workpiece and into engagement therewith to remove excess weight therefrom; sensing means to detect initial engagement of said cutter means with the workpiece with the clamped workpiece; storage means to retain the overweight information from said weighing scale of the clamped workpiece to control the feed stroke of said cutter means subsequent to its initial engagement with the clamped workpiece to remove a prescribed weight of material to decrease its weight to such standard weight; and index means to index successive weighed workpieces from said weighing station to said work station.

2. The machine of claim 1 wherein said index means is further operative to index successive overweight work pieces and successive machines work pieces, whereby the former are indexed to said weighing station and the latter are indexed from said work station.

3. The machine of claim 1 wherein said machine has load and unload stations respectively preceding and following said weighing and work stations, and idle stations between said load and weighing stations and said weighing and work stations to minimize the indexing stroke of said index means and thus shorten the cycle time of said machine.

4. The machine of claim 1 wherein said sensing means responds to increased load on said cutter means.

5. The machine of claim 1 wherein said cutter means is a milling cutter mounted on a motor driven spindle of said milling machine; and wherein said milling machine has a motor driven feed slide which feeds said spindle and milling cutter toward and into engagement with the clamped workpiece; and wherein said sensing means responds to increased load on the spindle drive motor.

6. The machine of claim 1 wherein said workpieces have weight bosses thereon of predetermined cross station area in a plane transverse to the feed movement of said cutter means; and wherein a converter operatively associated with said weighing scale converts the overweight information determined by said weighing scale to length of weight boss removal for retention in said storage means to control the feed stroke of said cutter means subsequent to initial engagement thereof with the clamped workpiece whereby a prescribed weight of weight boss will be removed by said cutter means to decrease the weight of the clamped workpiece to such standard weight.

7. The machine of claim 1 wherein said machine has a check weighing station and a reject station following said work station; said check weighing station having another weighing scale thereat to determine whether the successive machined workpieces thereon are within prescribed limits of such standard weight; and said reject station being operative in conjunction with said another weighing scale to divert substandard workpieces from the machine.

\* \* \* \* \*